(12) United States Patent
Tan et al.

(10) Patent No.: US 11,965,968 B2
(45) Date of Patent: Apr. 23, 2024

(54) OPTICAL SENSING SYSTEM AND OPTICAL SENSING METHOD

(71) Applicant: PixArt Imaging Inc., Hsin-Chu (TW)

(72) Inventors: Zi Hao Tan, Penang (MY); Joon Chok Lee, Penang (MY); Keen-Hun Leong, Penang (MY); Sai Mun Lee, Penang (MY)

(73) Assignee: PixArt Imaging Inc., Hsin-Chu (TW)

(*) Notice: Subject to any disclaimer, the term of this patent is extended or adjusted under 35 U.S.C. 154(b) by 756 days.

(21) Appl. No.: 17/110,315

(22) Filed: Dec. 3, 2020

(65) Prior Publication Data

US 2022/0179086 A1 Jun. 9, 2022

(51) Int. Cl.
*G01C 3/08* (2006.01)
*G01S 7/4861* (2020.01)
*G01S 7/4865* (2020.01)
*G01S 17/894* (2020.01)

(52) U.S. Cl.
CPC .......... *G01S 17/894* (2020.01); *G01S 7/4861* (2013.01); *G01S 7/4865* (2013.01)

(58) Field of Classification Search
None
See application file for complete search history.

(56) References Cited

U.S. PATENT DOCUMENTS

2014/0028804 A1* 1/2014 Usuda ............... G01S 7/4914
348/47

FOREIGN PATENT DOCUMENTS

| CN | 10245688 B | * | 1/2015 | ........... G01S 17/894 |
| CN | 111727602 A | * | 9/2020 | ........... G01S 7/4865 |

\* cited by examiner

*Primary Examiner* — Mark Hellner
(74) *Attorney, Agent, or Firm* — Winston Hsu

(57) ABSTRACT

An optical sensing system comprising: a processing circuit; an optical sensor, configured to sense first optical data respectively in first sensing time intervals; and a TOF (Time of Flight) optical sensor, configured to sense second optical data respectively in second sensing time intervals. The processing circuit computes a distance between a first object and the optical sensing system according to the second optical data. The first sensing time intervals do not overlap with the second sensing time intervals.

14 Claims, 5 Drawing Sheets

OPTICAL SENSING SYSTEM AND OPTICAL SENSING METHOD

BACKGROUND OF THE INVENTION

1. Field of the Invention

The present invention relates to an optical sensing system and an optical sensing method, and particularly relates to an optical sensing system and an optical sensing method which can avoid interference caused by light used by another optical sensor.

2. Description of the Prior Art

A conventional optical sensing system may comprise different optical sensors for different application. However, the sensing of one optical sensor may interfere the sensing of another optical sensor. For example, an optical sensing system has two optical sensors, and the light used by one of the optical sensor may interfere the image sensing of the other optical sensor.

Therefore, an optical sensing system which can solve such issue is needed.

SUMMARY OF THE INVENTION

One objective of the present invention is to provide an optical sensing system which can make sure that different optical sensors do not sense optical data simultaneously.

Another objective of the present invention is to provide an optical sensing method which can make sure that different optical sensors do not sense optical data simultaneously.

One embodiment of the present invention is to provide an optical sensing system comprising: a processing circuit; an optical sensor, configured to sense first optical data respectively in first sensing time intervals; and a TOF (Time of Flight) optical sensor, configured to sense second optical data respectively in second sensing time intervals. The processing circuit computes a distance between a first object and the optical sensing system according to the second optical data. The first sensing time intervals do not overlap with the second sensing time intervals.

Another embodiment of the present invention discloses an optical sensing method, applied to an optical sensing system comprising an optical sensor and a TOF optical sensor, comprising: sensing first optical data respectively in first sensing time intervals by the optical sensor; sensing second optical data respectively in second sensing time intervals by the TOF optical sensor; and computing a distance between a first object and the optical sensing system according to the second optical data. The first sensing time intervals do not overlap with the second sensing time intervals.

In view of above-mentioned embodiments, the optical sensor and the TOF optical sensor do not capture optical data simultaneously, thus the conventional interference problem can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Also, the method in following descriptions can be executed by programs stored in a non-transitory computer readable recording medium such as a hard disk, an optical disc or a memory. Besides, the term "first", "second", "third" in following descriptions are only for the purpose of distinguishing different one elements, and do not mean the sequence of the elements. For example, a first device and a second device only mean these devices can have the same structure but are different devices.

Figure 1:
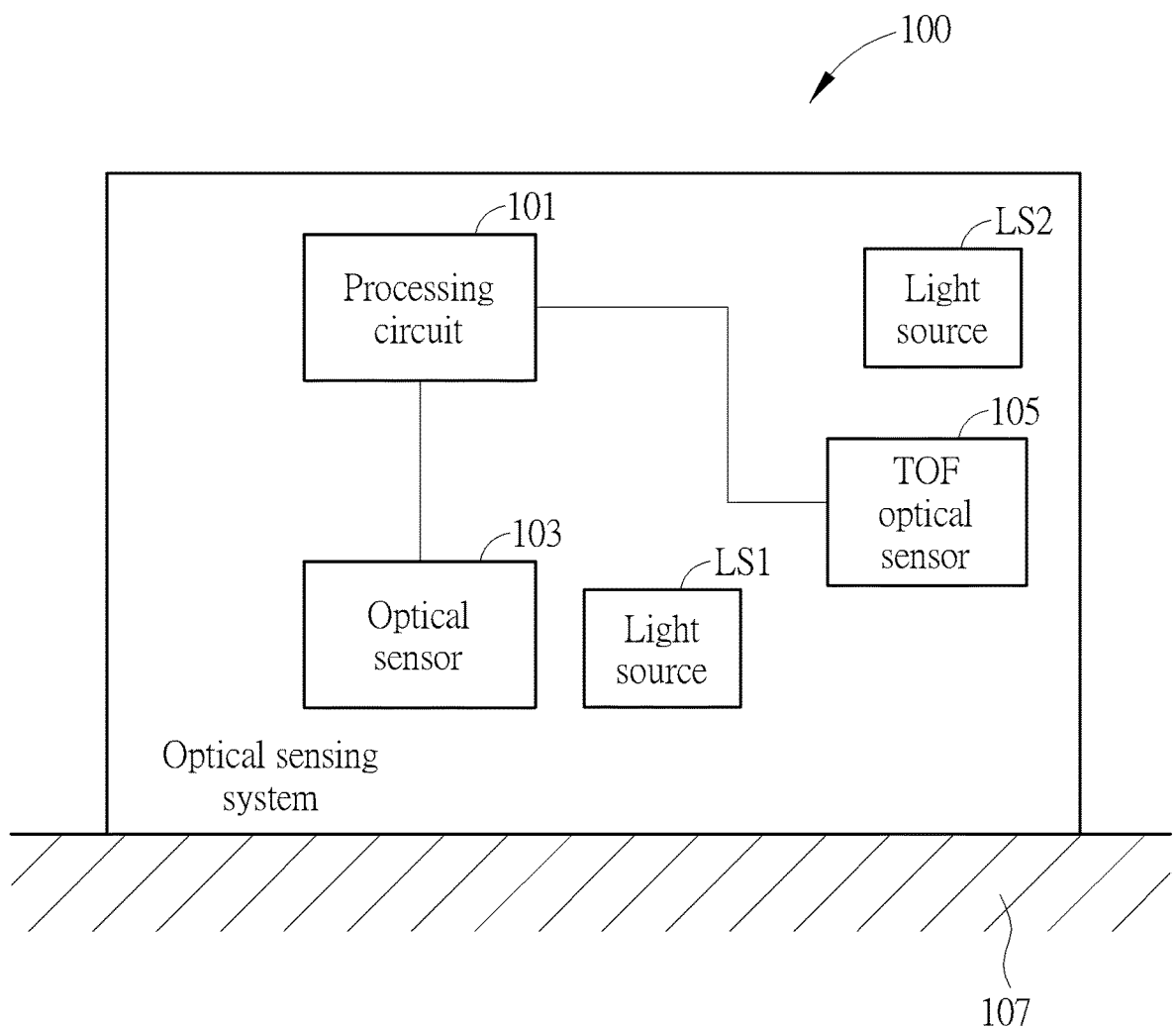
FIG. 1 is a block diagram illustrating an optical sensing system according to one embodiment of the present invention.

FIG. 1 is a block diagram illustrating an optical sensing system 100 according to one embodiment of the present invention. As illustrated in FIG. 1, the optical sensing system 100 comprises a processing circuit 101 (e.g., a processor), an optical sensor 103, a TOF (Time Of Flight) optical sensor 105, a first light source LS1 and a second light source LS2. The optical sensor 103 is configured to sense first optical data (e.g., images), which is generated according to light emitted from the first light source LS1. The TOF optical sensor 105 is configured to sense second optical data (e.g., images), which is generated according to light emitted from the second light source LS2.

The processing circuit 101 computes a distance between a first object and the optical sensing system 100 according to the second optical data. The first object can be, for example, a wall, furniture or an obstacle. Besides, in one embodiment, the processing circuit 101 computes a relative movement between a second object and the optical sensing system 100 according to the first optical data. In such embodiment, the optical sensing system 100 can be regarded as an optical navigation system. In the embodiment of FIG. 1, the processing circuit 101 computes a relative movement between a surface 107 and the optical sensing system 100 according to the first optical data. The surface 107 (the second object) can be, for example, a surface of a desk or a ground.

Figure 2:
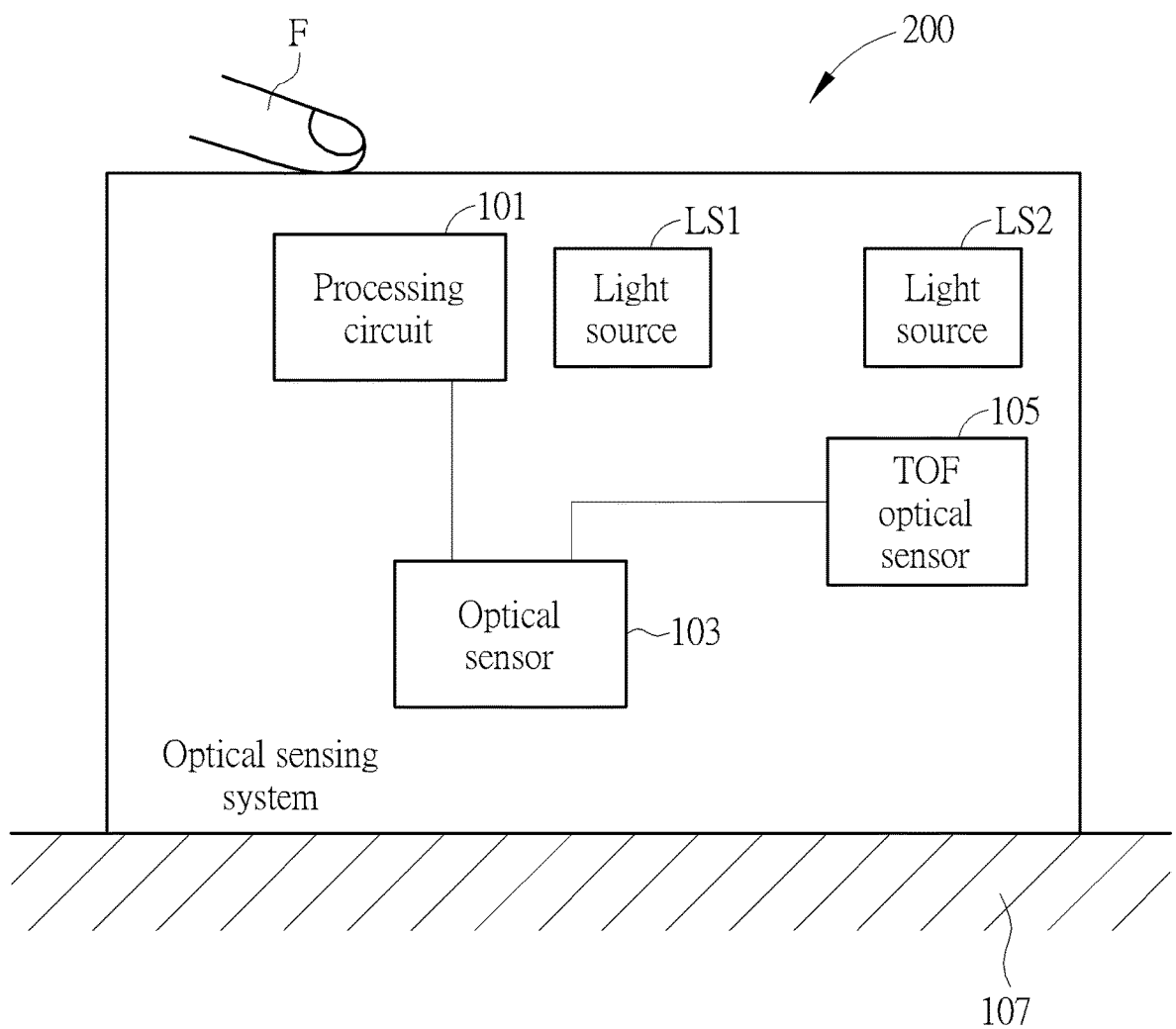
FIG. 2 is a block diagram illustrating an optical sensing system according to another embodiment of the present invention.

However, the second object is not limited to be under the optical sensing system 100. Also, the optical sensor 103 is not limited to face down to sense the first optical data. FIG. 2 is a block diagram illustrating an optical sensing system according to another embodiment of the present invention. As illustrated in FIG. 2, the optical sensing system 200 also comprises a processing circuit 101 (e.g., a processor), an optical sensor 103, a TOF optical sensor 105, a first light source LS1 and a second light source LS2. The difference between the optical sensing system 100 in FIG. 1 and the optical sensing system 200 in FIG. 2 is that the optical sensor 103 in FIG. 2 faces up to capture first optical data rather than faces down. In such case, the optical sensing system 200 may further comprise a touch screen, and the second object can be an object which performs touch control to the touch screen, such as the finger F illustrated in FIG. 2.

Please note the optical sensing system provided by the present invention is not limited to above-mentioned embodiments. For example, in other embodiments, the first light source LS1 can be provided outside the optical sensing system or be removed from the optical sensing system.

Figure 3:
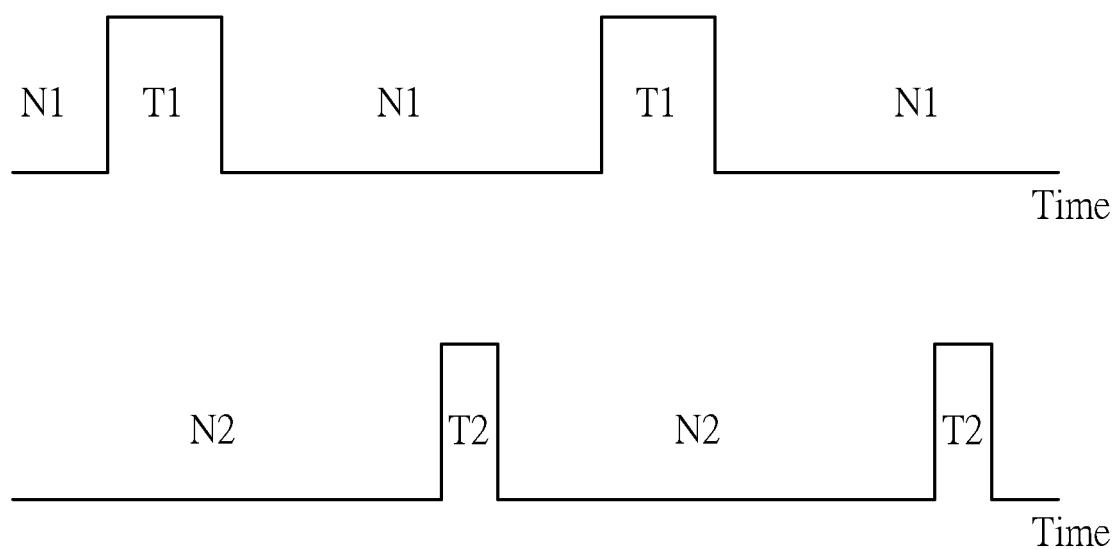
FIG. 3 and FIG. 4 are schematic diagrams illustrating operations of the optical sensing system, according to different embodiments of the present invention.

FIG. 3 is a schematic diagram illustrating operations of the optical sensing system, according to one embodiment of the present invention. The optical sensor 103 senses first optical data in the first sensing time intervals T1 in FIG. 3 and the TOF optical sensor 105 senses second optical data in the second sensing time intervals T2 in FIG. 3. Therefore, according to FIG. 3, the optical sensor 103 and the TOF optical sensor 105 respectively senses the first optical data and the second optical data alternately. For more detail, the optical sensor 103 periodically senses the first optical data in the first sensing time intervals T1 and does not sense the first optical data in the first non-sensing time intervals N1. Also, the TOF optical sensor 105 periodically senses the second optical data in the second sensing time intervals T2 and does not sense the second optical data in the second non-sensing time intervals N2. The first sensing time intervals T1 overlaps with the second non-sensing time intervals N2 but does overlap with the second sensing time intervals T2. Besides, the first non-sensing time intervals N1 overlaps with the second sensing time intervals T2 but does overlap with the second non-sensing time intervals N2.

In one embodiment, the optical sensing system 100 or 200 further comprises a shutter. The shutter opens in the first sensing time intervals T1, such that the optical sensor 103 can sense first optical data respectively in first sensing time intervals T1, and is closed at time which is not in the first sensing time intervals T1 (e.g., the first non-sensing time intervals N1). In such embodiment, the optical sensor 103 can always turn on, or turns on/turns off corresponding to open/close of the shutter.

In one embodiment, the optical sensor 103 is turned on in the first sensing time intervals T1 and is turned off at time which is not in the first sensing time intervals N1 (e.g., the first non-sensing time intervals N1). In such case, the optical sensing system 100 can comprise a shutter, or can comprise no shutter as well.

Many methods can be used to set the second sensing time intervals T2 to make sure the first sensing time intervals T1 and the second sensing time intervals T2 do not overlap with each other. Such setting can be performed by the processing circuit 101, the TOF optical sensor 105 or any other circuit which can control the TOF optical sensor 105. In other words, the second optical data sensing operation of the TOF optical sensor 105 can be controlled by the processing circuit 101, the TOF optical sensor 105 or any other circuit. Please note, the following embodiments set the second sensing time intervals T2 to make sure the first sensing time intervals T1 and the second sensing time intervals T2 do not overlap with each other. However, the first sensing time intervals T1 can also be set under the same concept to reach the same function.

Figure 4:
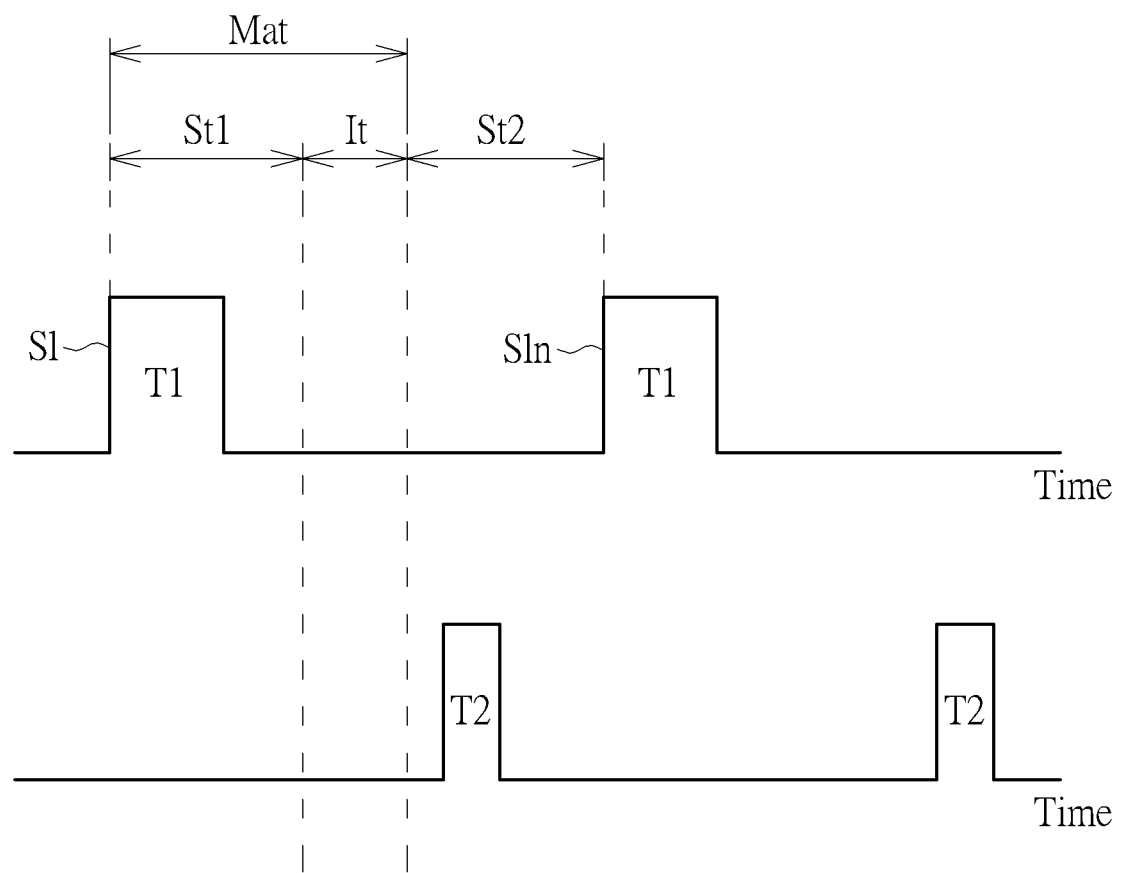

As shown in FIG. 4, the second sensing time intervals T2 are set according to a first set time interval St1, a second first set time interval St2, and an initialization time interval It. The first set time interval St1 starts at a start time of the first sensing time interval T1 and is larger than the first sensing time interval T1. Also, the initialization time interval It, which is a time interval in which the TOF optical sensor 105 completes preparation of sensing the second optical data, is after the first set time interval St1. The preparation of sensing the second optical data can be, for example, the TOF optical sensor 105 sets components therein such that the components can sense the second optical data. Besides, the second set time interval T2 starts after the initialization time interval It, is larger than the second optical sensing time interval T2 and covers the second optical sensing time interval T2. In one embodiment, the second set time interval St2 ends at a start time S1n of a next one of the first sensing time intervals. In view of these descriptions, the second sensing time intervals T2 can be regarded as set based on triggering of start of the first sensing time intervals T1.

In one embodiment, the initialization time interval It and a maximum optical sensor sensing time interval can be acquired by the system information already included in the optical sensing system. The maximum optical sensor sensing time interval means a maximum time interval in which the optical sensor 103 can sense the first optical data. For example, the maximum optical sensor sensing time interval means a maximum time interval in which the shutter may open, or a maximum time interval in which the optical sensor 103 may keep turning on.

In such case, the second sensing time intervals T2 can be set by following steps: acquiring the initialization time interval It and a maximum optical sensor sensing time interval Mat; computing the first set time interval St1 by subtracting the initialization time interval It from the maximum optical sensor sensing time interval Mat; and computing the second set time interval St2 according to the second optical sensing time interval T2 and the initialization time interval It. However, the second sensing time intervals T2 is not limited to be set according to the maximum optical sensor sensing time interval Mat. For example, the second sensing time intervals T2 can be set according to start of the first sensing time intervals T1 plus a predetermined time interval.

Figure 5:
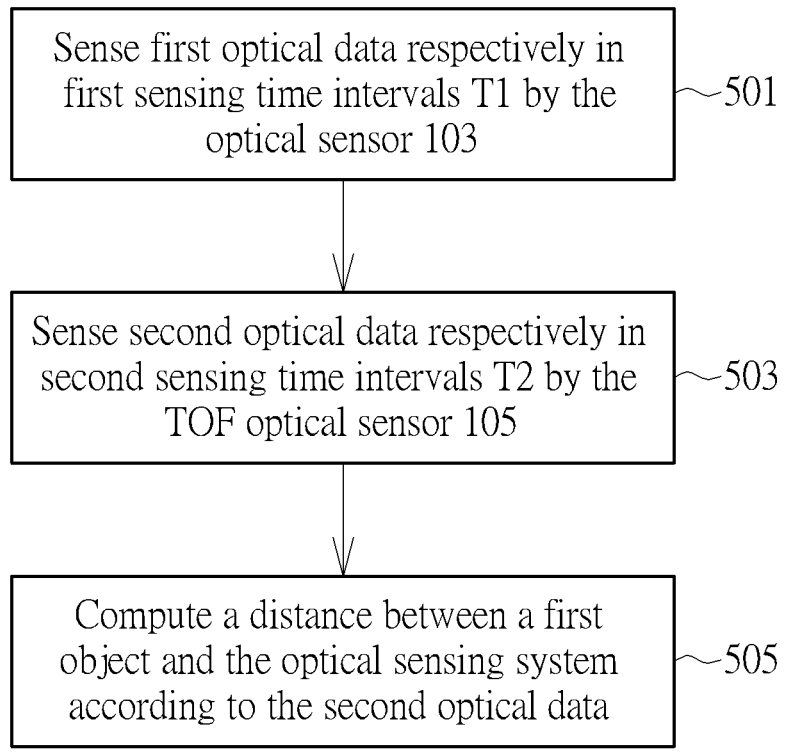
FIG. 5 is a flow chart illustrating an optical sensing method according to one embodiment of the present invention.

In view of above-mentioned embodiments, an optical sensing method applied to an optical sensing system comprising an optical sensor and a TOF optical sensor can be acquired. FIG. 5 is a flow chart illustrating an optical sensing method according to one embodiment of the present invention, which comprises following steps:

Step 501

Sense first optical data respectively in first sensing time intervals T1 by the optical sensor 103.

Step 503

Sense second optical data respectively in second sensing time intervals T2 by the TOF optical sensor 105.

Step 505

Compute a distance between a first object and the optical sensing system according to the second optical data.

The first optical data and the second optical data are alternately sensed, and the first sensing time intervals do not overlap with the second sensing time intervals.

Please note the sequence of the steps 501, 503, 503 are not limited to the sequence illustrated in FIG. 5. Also, other detail steps can be acquired based on above-mentioned embodiments, thus are omitted for brevity here.

In view of above-mentioned embodiments, the optical sensor and the TOF optical sensor do not capture optical data simultaneously, thus the conventional interference problem can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensing system, comprising:
a processing circuit;
an optical sensor, configured to sense first optical data respectively in first sensing time intervals; and
a TOF (Time of Flight) optical sensor, configured to sense second optical data respectively in second sensing time intervals;
wherein the processing circuit computes a distance between a first object and the optical sensing system according to the second optical data;
wherein the first sensing time intervals do not overlap with the second sensing time intervals;
wherein the second sensing time intervals are set based on triggering of start of the first sensing time intervals;
wherein the second sensing time intervals are set according to a first set time interval, a second first set time interval, and an initialization time interval;
wherein the first set time interval starts at a start time of the first sensing time interval and is larger than the first sensing time interval;
wherein the initialization time interval, which is a time interval in which the TOF optical sensor completes preparation of sensing the second optical data, is after the first set time interval;
wherein the second set time interval starts after the initialization time interval, larger than the second optical sensing time interval and covers the second optical sensing time interval.

2. The optical sensing system of claim 1, wherein the optical sensor and the TOF optical sensor respectively senses the first optical data and the second optical data alternately.

3. The optical sensing system of claim 1, wherein the processing circuit computes a relative movement between a second object and the optical sensing system according to the first optical data.

4. The optical sensing system of claim 1, further comprising:
a shutter;
wherein the shutter opens in the first sensing time intervals, such that the optical sensor can sense first optical data respectively in first sensing time intervals, and is closed at time which is not in the first sensing time intervals.

5. The optical sensing system of claim 1,
wherein the optical sensor is turned on in the first sensing time intervals and is turned off at time which is not in the first sensing time intervals.

6. The optical sensing system of claim 1, wherein the second set time interval ends at a start time of a next one of the first sensing time intervals.

7. The optical sensing system of claim 1, wherein the second sensing time intervals are set according to following steps:
acquiring the initialization time interval and a maximum optical sensor sensing time interval;
computing the first set time interval by subtracting the initialization time interval from the maximum optical sensor sensing time interval; and
computing the second set time interval according to the second optical sensing time interval and the initialization time interval.

8. An optical sensing method, applied to an optical sensing system comprising an optical sensor and a TOF optical sensor, comprising:
sensing first optical data respectively in first sensing time intervals by the optical sensor;
sensing second optical data respectively in second sensing time intervals by the TOF optical sensor; and
computing a distance between a first object and the optical sensing system according to the second optical data;
wherein the first sensing time intervals do not overlap with the second sensing time intervals;
wherein the second sensing time intervals are set based on triggering of start of the first sensing time intervals;
wherein the second sensing time intervals are set according to a first set time interval, a second first set time interval, and an initialization time interval;
wherein the first set time interval starts at a start time of the first sensing time interval and is larger than the first sensing time interval;
wherein the initialization time interval, which is a time interval in which the TOF optical sensor completes preparation of sensing the second optical data, is after the first set time interval;
wherein the second set time interval starts after the initialization time interval, larger than the second optical sensing time interval and covers the second optical sensing time interval.

9. The optical sensing method of claim 8, wherein the first optical data and the second optical data are alternately sensed.

10. The optical sensing method of claim 8, further comprising:
computing a relative movement between a second object and the optical sensing system according to the first optical data.

11. The optical sensing method of claim 8,
wherein the optical sensing system further comprises a shutter;
wherein the shutter opens in the first sensing time intervals, such that the optical sensor can sense first optical data respectively in first sensing time intervals, and is closed at time which is not in the first sensing time intervals.

12. The optical sensing method of claim 8,
wherein the optical sensor is turned on in the first sensing time intervals and is turned off at time which is not in the first sensing time intervals.

13. The optical sensing method of claim 8, wherein the second set time interval ends at a start time of a next one of the first sensing time intervals.

14. The optical sensing method of claim 8, wherein the second sensing time intervals are set according to following steps:
acquiring the initialization time interval and a maximum optical sensor sensing time interval;
computing the first set time interval by subtracting the initialization time interval from the maximum optical sensor sensing time interval; and
computing the second set time interval according to the second optical sensing time interval and the initialization time interval.

* * * * *